US009946334B2

(12) United States Patent
Pala et al.

(10) Patent No.: US 9,946,334 B2
(45) Date of Patent: Apr. 17, 2018

(54) METHOD TO DETERMINE DRIVER WORKLOAD FUNCTION AND USAGE OF DRIVER WORKLOAD FUNCTION FOR HUMAN-MACHINE INTERFACE PERFORMANCE ASSESSMENT

(75) Inventors: Silviu Pala, Birmingham, MI (US); Seishi Yoshida, Farmington Hills, MI (US); Justin McBride, South Lyon, MI (US); Carolina Rigney, West Bloomfield, MI (US); Bo Sun, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 1580 days.

(21) Appl. No.: 13/337,671

(22) Filed: Dec. 27, 2011

(65) Prior Publication Data

US 2012/0174111 A1    Jul. 5, 2012

Related U.S. Application Data

(60) Provisional application No. 61/428,521, filed on Dec. 30, 2010.

(51) Int. Cl.
  *G09B 9/04*    (2006.01)
  *G06F 3/01*    (2006.01)
  *G06F 9/44*    (2018.01)

(52) U.S. Cl.
  CPC ............... *G06F 3/011* (2013.01); *G06F 8/38* (2013.01)

(58) Field of Classification Search
  CPC .......... G06F 3/011; G09B 9/04; G09B 19/167
  (Continued)

(56) References Cited

U.S. PATENT DOCUMENTS 6,457,975 B1 * 10/2002 Miranda et al. .............. 434/236
6,974,326 B2   12/2005 Marple-Horvat
(Continued)

FOREIGN PATENT DOCUMENTS

JP    2008-079737    4/2008
JP    2010-033549    2/2010
(Continued)

OTHER PUBLICATIONS

Office Action dated Aug. 19, 2014 in corresponding Japanese Patent Application No. 2013-544885 with English translation.
(Continued)

*Primary Examiner* — Thomas Hong
(74) *Attorney, Agent, or Firm* — Harness, Dickey & Pierce, P.L.C.

(57) ABSTRACT

A method of objectively measuring a driver's ability to operate a motor vehicle user interface. The method includes objectively measuring the driver's ability to perform each one of a plurality of calibration tasks of various degrees of difficulty including an easy task, a medium task, and a difficult task; generating a scale with which to evaluate the driver's ability to operate the user interface, the scale customized for the driver based on the objective measurements of the driver's ability to perform each calibration task; objectively measuring the driver's ability to operate a function of the motor vehicle user interface; and objectively evaluating the driver's ability to operate the function of the motor vehicle user interface using the scale to determine if the user interface is appropriate for the driver.

14 Claims, 3 Drawing Sheets

(58) Field of Classification Search
USPC ....... 434/236, 258, 29; 340/438, 576; 701/1, 701/42; 78/102
See application file for complete search history.

(56) References Cited

U.S. PATENT DOCUMENTS

| | | | |
|---|---|---|---|
| 7,394,393 B2 | 7/2008 | Zhang et al. | |
| 7,428,449 B2 | 9/2008 | Fehr et al. | |
| 8,096,946 B2* | 1/2012 | Burton | A61B 5/18 340/575 |
| 8,692,739 B2* | 4/2014 | Mathieu | B60R 1/00 340/436 |
| 2004/0113799 A1* | 6/2004 | Geisler | G06Q 10/00 340/576 |
| 2006/0154221 A1* | 7/2006 | Jones | A61B 5/18 434/258 |
| 2007/0063854 A1* | 3/2007 | Zhang | B60W 40/09 340/576 |
| 2007/0273611 A1* | 11/2007 | Torch | A61B 3/0066 345/8 |
| 2008/0082372 A1* | 4/2008 | Burch | 705/4 |
| 2008/0188777 A1* | 8/2008 | Bedziouk | A61B 5/16 600/595 |
| 2009/0143961 A1 | 6/2009 | Gaviani et al. | |

FOREIGN PATENT DOCUMENTS

| | | |
|---|---|---|
| JP | 2014-509877 | 4/2014 |
| WO | 2010-032491 | 3/2010 |

OTHER PUBLICATIONS

Elling, M. and Sherman, P., "Evaluation of Steering Wheel Measures for Drowsy Drivers", Proceedings of the 27th ISATA Conference, 1994.

Wierwille, WW, Ellsworth, LA, Wreggit, SS, Fairbands, RJ, Kim, CL, "Research on Vehicle Based Driver Status/Performance Monitoring: Development, Validation, and Refinement of Algorithms for Detection of Driver Drowsiness.", National Highway Traffic Safety, Administration Final Report: DOT HS 808 247, 1994.

Pope et al., "Biocybernetic System Validates Index of Operator Engagement in Automated Task", Biological Psychology, vol. 40, Nos. 1 and 2, May 1995, pp. 300-306.

Schmorrow, D., Stanney, K.M., Wilson, G., & Young, P., "Augmented Cognition in Human-System Interaction". In G. Salvendy (Ed.), Handbook of Human Factors and Ergonomics ($3^{rd}$ edition). New York: John Wiley. 2008.

Berke, C., Levendowski, D.J., Cvetinovic, M., Petrovic, M. M., Davis, G. F., Lumicao, M. N., Popovic, M. V., Zikovic, V. T., Olmmstead, R. E., "Real-Time Analysis of EEG Indices of Alterness, Cognition and Memory Acquired with a Wireless EEG Headset." International Journal of Human-Computer Interaction, 17, 151-170., 2004.

Cohn, J., Balaban, C., Muth, E., Brendley, K., Stripling, R., "Automatic Behavioral Responses as a Measure of Immersion in Virtual Environments", Proceedings of the $10^{th}$ International Conference on Human-Computer Interaction, Crete, Greece, Jul. 22-27, 2003, pp. 1133-1137.

Prinzel, L.J., Freeman, F.G., Scerbo, M.W., Mikulka, P.J., & Pope, A.T., "A Closed-Loop System for Examining Psychophysiological Measures for Adaptive Task Allocation", International Journal of Aviation Psychology, 10(4), 393-410, 2000.

Prinzel, Lawrence J., III; Pope, Alan T.; Freeman, Frederick G.; Scerbo, Mark W.; Mikulka, Peter J., "Empirical Analysis of EEG and ERPs for Psychophysiological Adaptive Task Allocation", NASA Report No. L-18076; NAS 1.15:211016; NASA/TM-2001-211016, 2001.

Schnell T., Macuda T., Aviation Training Using Physiological and Cognitive Instrumentation, in "The PSI Handbook of Virtual Environments for Training and Education", ISBN 0-313-35165-1, Edited by Cdr. Dylan Schmorrow, Joseph Cohn, and Denise Nicholson, 2008c.

Schnell T., Keller, M., Poolman P., "Quality of Training Effectiveness Assessment (QTEA); a Neurophysiologically Based Method to Enhance Flight Training," In Proceedings of the $27^{th}$ Digital Avionics System Conference (DASC), St. Paul, MN, Dec. 26-30, 2008.

Search Report and Written Opinion dated Aug. 22, 2012 in corresponding PCT Application No. PCT/US2011/067454.

* cited by examiner

FIG. 3

Table 1

| | DWF | Total DWF weighted | total task time(s) | | | | visual % glance time off road | | | | number of critical glances to HMI | | | |
|---|---|---|---|---|---|---|---|---|---|---|---|---|---|---|
| | final (stretched DWF value) | | weighted value | DWF factor | scale factor | raw/variable | weighted value | DWF factor | scale factor | raw/variable | weighted value | DWF factor | scale factor | raw/variable |
| pre-determined reference task (calibration tasks) workload value | | | | 0.25 | 0.1 | | | 0.6 | 1.00E+01 | | | 0.6 | 1.00E+01 | 1.00E+00 |
| drive only | 1.37E+00 | REF | 0 | | | 0 | 3.00E-01 | | | 1.50E+01 | 6.00E-02 | | | 1.00E+00 |
| | | | | | | 0 | | | | 10 | | | | 1 |
| drive + Low task | 3.24E+00 | 1.25E+00 | 5.00E-02 | | | 2 | 9.00E-01 | | | 1.50E+01 | 6.00E-02 | | | 1.00E+00 |
| | | | | | | 5 | | | | 50 | | | | 2 |
| drive + Med task | 4.75E+00 | 2.96E+00 | 7.50E-02 | | | 3 | 2.40E+00 | | | 40 | 6.00E-02 | | | 1 |
| | | | | | | 10 | | | | 60 | | | | 4 |
| drive + Hi task | 7.48E+00 | 4.33E+00 | 2.00E-01 | | | 8 | 3.00E+00 | | | 50 | 1.80E-01 | | | 3 |
| | | | | | | 15 | | | | 75 | | | | 6 |
| | | 6.82E+00 | 3.25E-01 | | | 13 | 3.50E+00 | | | 65 | 3.00E-01 | | | 5 |
| HMI task (change radio) | 4.17E+00 | 3.80E+00 | 2.25E-01 | | | 11 | 2.70E+00 | | | 55 | 1.20E-01 | | | 3 |
| | | | | | | 9 | | | | 45 | | | | 2 |

Table 2

| HRV | | | | | SRL | | | | | EEG Beta 1 | | | | | EEG Beta 2 | | | | |
|---|---|---|---|---|---|---|---|---|---|---|---|---|---|---|---|---|---|---|---|
| weighted value | DWF Factor | scale factor | raw/variable | | weighted value | DWF factor | scale factor | raw/variable | | weighted value | DWF Factor | scale factor | raw/variable | | weighted value | DWF Factor | scale factor | raw/variable | |
| 1.76E+00 | 0.22 | 1.00E+01 | 8.00E+01 | | 3.75E-01 | 0.15 | 1.00E+02 | 2.50E-02 | | 3.00E-01 | 0.15 | 1.00E+06 | 2.00E-06 | | 4.00E-01 | 0.1 | 1.00E+06 | 4.00E-06 |
| | | | 8.20E+01 | | | | | 3.00E-02 | | | | | 2.40E-06 | | | | | 4.20E-06 |
| drive only | | | 81 | | | | | 0.0275 | | | | | 0.0000022 | | | | | 0.0000041 |
| 8.80E-02 | | | 4.00E+00 | | 7.50E-02 | | | 5.00E-03 | | 3.00E-02 | | | 4.00E-07 | | 2.00E-01 | | | 2.00E-07 |
| drive + Low task | | | 85 | | | | | 0.035 | | | | | 3.20E-06 | | | | | 4.80E-06 |
| 8.80E-02 | | | 4 | | 1.13E-01 | | | 0.0075 | | 1.50E-01 | | | 0.000001 | | 7.00E-02 | | | 0.0000007 |
| drive + Med task | | | 90 | | | | | 0.05 | | | | | 4.50E-06 | | | | | 4.80E-06 |
| 1.98E+00 | | | 9 | | 3.38E-01 | | | 0.0225 | | 3.45E-01 | | | 0.000023 | | 7.00E-02 | | | 0.0000007 |
| drive + Hi task | | | 100 | | | | | 0.1 | | | | | 7.00E-06 | | | | | 4.80E-06 |
| 4.18E-01 | | | 19 | | 1.09E+00 | | | 0.0725 | | 7.20E-01 | | | 0.0000048 | | 7.00E-02 | | | 0.0000007 |
| HMI task (change radio) | | | 87 | | | | | 0.04 | | | | | 5.00E-06 | | | | | 4.30E-06 |
| 1.32E-01 | | | 6 | | 1.88E-01 | | | 0.0125 | | 4.20E-01 | | | 2.80E-06 | | 2.00E-01 | | | 2.00E-07 |

METHOD TO DETERMINE DRIVER WORKLOAD FUNCTION AND USAGE OF DRIVER WORKLOAD FUNCTION FOR HUMAN-MACHINE INTERFACE PERFORMANCE ASSESSMENT

CROSS-REFERENCE TO RELATED APPLICATIONS

This application claims the benefit of U.S. Provisional Application No. 61/428,521, filed on Dec. 30, 2010, the entire disclosure of which is incorporated herein by reference.

FIELD

The present disclosure relates to a method to determine a driver workload function and use of the driver workload function for human-machine interface performance assessment and customization.

BACKGROUND

This section provides background information related to the present disclosure, which is not necessarily prior art.

Operation of a vehicle, such as an automobile or aircraft, typically requires that the driver or operator interact with a user interface. Modern user interfaces can include various graphics and digital display formats, and can be operated in a variety of different ways, such as with voice commands, touch displays, and joysticks. Proficiency to operate modern user interfaces varies greatly among drivers. For example, older drivers who are accustomed to traditional dial speedometers may find it more difficult to operate modern user interfaces than younger drivers who have grown up playing video games, which often include similar user interfaces.

To measure a driver's ability and workload required to operate a particular user interface, as well as rate the ease of use for a particular user interface, drivers are often asked to answer a series of questions requiring subjective answers. For example, for a particular task, such as placing a telephone call, the driver may be asked the following series of questions: was it possible to complete the task; was the workload tolerable for the task; were you able to adequately concentrate on operating the vehicle during performance of the task; on a scale of one to ten, how difficult was it overall to operate the user interface to complete the task? Because the questions solicit subjective answers, it is difficult to arrive at an accurate assessment of the drivers ability to operate a particular user interface, particularly for a driver who overestimates his/her skills or is simply embarrassed to admit deficiencies in his/her skill set. Applicants' have thus invented a method for objectively measuring a driver's ability to operate a motor vehicle user interface, which allows the user interface to be customized to the driver's ability.

SUMMARY

This section provides a general summary of the disclosure, and is not a comprehensive disclosure of its full scope or all of its features.

The present teachings provide for a method of objectively measuring a driver's ability to operate a motor vehicle user interface. The method includes the following: objectively measuring the driver's ability to perform each one of a plurality of calibration tasks of various degrees of difficulty including an easy task, a medium task, and a difficult task; generating a scale with which to evaluate the driver's ability to operate the user interface, the scale customized for the driver based on the objective measurements of the driver's ability to perform each calibration task; objectively measuring the driver's ability to operate a function of the motor vehicle user interface; and objectively evaluating the driver's ability to operate the function of the motor vehicle user interface using the scale to determine if the user interface is appropriate for the driver.

The present teachings also provide for a method of objectively measuring a driver's ability to operate a motor vehicle user interface. The method includes: objectively measuring the driver's ability to perform each one of a plurality of calibration tasks of various degrees of difficulty including a drive only task, an easy task while driving, a medium task while driving, and a difficult task while driving; generating a scale with which to measure the driver's ability to operate the user interface, the scale customized for the driver based on the objective measurements of the driver's ability to perform each calibration task; objectively measuring and evaluating the driver's ability to operate a function of the motor vehicle user interface using the scale; and customizing the user interface for the user based on the user's ability to operate the function.

The present teachings further provide for a method of objectively measuring a driver's ability to operate a motor vehicle user interface. The method includes objectively measuring driver workload required to perform each one of a plurality of calibration tasks of various degrees of difficulty; generating a scale with which to measure workload incurred by the driver during operation of the user interface, the scale personalized for the driver based on the objective measurements of the workload used by the driver during performance of the calibration tasks; objectively measuring driver workload used by the driver to operate a function of the motor vehicle user interface; objectively evaluating workload used by the driver to operate the function of the motor vehicle user interface; and customizing the user interface for the driver to optimize workload used by the driver to operate the user interface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 illustrates exemplary calculations, measurements, and results of the method of FIG. 1.

Corresponding reference numerals indicate corresponding parts throughout the several views of the drawings.

DETAILED DESCRIPTION

Example embodiments will now be described more fully with reference to the accompanying drawings.

Figure 1:
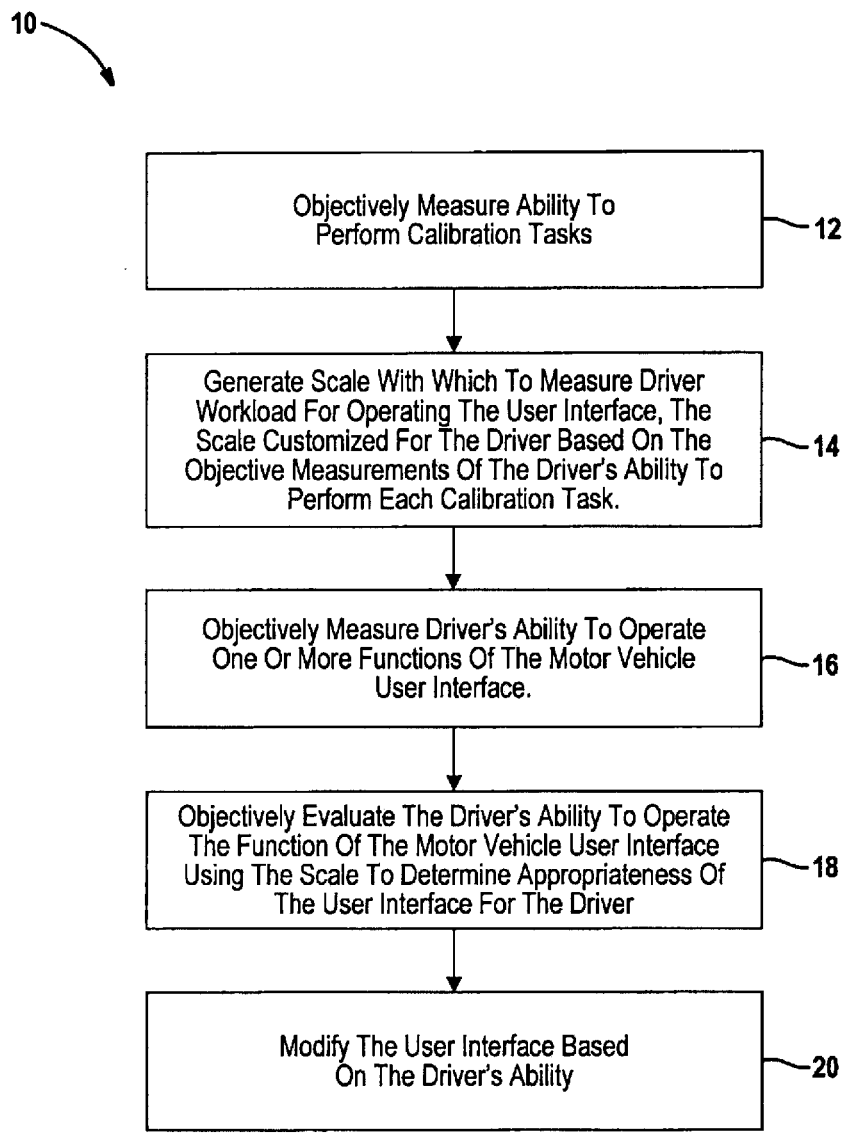
FIG. 1 illustrates a method of objectively measuring a driver's ability to operate a motor vehicle user interface according to the present teachings.

With initial reference to FIG. 1, a method for objectively measuring a driver's ability to operate a motor vehicle user interface or human machine interface (HMI) is generally illustrated at reference numeral 10. At block 12, the driver's ability to perform each one of a plurality of calibration or reference tasks of various degrees of difficulty is measured. The driver's ability to perform each calibration task can be measured in terms of amount of driver workload required to perform each task. Any suitable number of calibration tasks of varying degrees of difficulty can be used. The calibration tasks can be performed using a test terminal or computer, such as the HMI evaluator device 30 of FIG. 2 further described herein. The calibration tasks can be performed either away from a vehicle, in a stationary vehicle, and/or while the driver is operating a vehicle. The calibration tasks are assigned a predetermined workload value, such as on a scale of one (1) to ten (10), one being the easiest and ten being the most difficult.

The calibration tasks can be artificial surrogate tasks, actual tasks (face valid tasks), or a combination thereof. For example, the driver can be presented with a series of circles on a terminal or computer and asked to identify & touch the area with the largest circle or circles. A plurality of arrows can also be displayed to the driver, and the driver can be instructed to identify the arrow or arrows that are pointing in a direction that is different than the others and touch it. The patterns of circles and arrows can vary depending on the desired difficulty of the tasks. The surrogate tasks can also include one or more auditory or hearing tests. The surrogate tasks may thus include any suitable task or test for determining a driver's cognitive, visual, manipulative, attention, concentration, or auditory workload.

Another exemplary surrogate calibration task includes presenting the driver with a series of numbers and instructing him/her to identify a particular number or number sequence. A sequence of numbers of between 1 and 9, for example, can be shown to the driver on a portable terminal or computer one number at a time. When the driver sees the target sequence for a particular calibration task, he or she will be instructed to push both left and right buttons of the terminal simultaneously. For an easy task, the driver can be instructed to press both buttons if a number "5" is displayed. For a task of medium difficulty, the driver can be asked to press both buttons if the last three numbers have been even. For a difficult task, the driver can be asked to press both buttons if the number displayed appeared two numbers previously.

The calibration tasks can also include actual or non-artificial face valid tasks performed in a vehicle or on a mock user interface. Actual or non-artificial calibration tasks can include, for example, one or more of the following: increasing the temperature to 75° F.; increasing or decreasing the HVAC fan speed one level; changing the HVAC mode, such as from air conditioning to ventilation mode; presetting a single radio station; increasing or decreasing the radio volume one level; answering a phone call; programming a GPS navigation route, etc. As with the surrogate or artificial tasks, each of these calibration tasks will be assigned a predetermined level of difficulty in the range of one (1) to ten (10).

The calibration tasks can include a drive only task, as well as easy, medium, and hard tasks performed while driving. For example, the drive only task can be assigned a workload value of one (1); the easy task performed while driving, such as selecting a vertical arrow from an arrangement of three horizontal arrows, can be assigned a value of three (3); the medium task performed while driving, such as selecting a vertical arrow from nine horizontal arrows, can be assigned a value of five (5); and the hard task performed while driving, such as selecting the two largest circles from a plurality of twenty or more smaller circles, can be assigned a value of eight (8). The calibration tasks can also include one or more face valid tasks, such as changing the HVAC fan speed.

The driver's ability to perform each calibration task is objectively measured in any one of a variety of suitable ways. The driver's ability is tested in terms of workload, which can be measured with respect to performance (such as speed, in-lane position, task time), perception (such as eye tracking, glance time, total time, frequency), and/or physiological (such as brain wave activity, heart rate, heart rate variability, respiration). For example, any one or more of the following performance parameters can be measured for each task: total task time in seconds, percentage of time that the driver's eyes are off the road; number of critical glances to the user interface; heart rate and heart rate variability; skin resistance or conductance level (SRL), which can measure body precipitation, e.g., sweaty palms; and brain wave activity (EEG).

The performance parameters can be measured to arrive at a raw parameter score for each performance parameter using any suitable type of measuring equipment or device. For example, the skin resistance level of the driver's palms can be measured with sensors placed on the steering wheel. Heart rate can be measured with an electrocardiogram (ECG) or with sensors in the steering wheel. Brain waves can be measured using electroencephalography (EEG), such as with an EEG sensor electrode net. Any suitable brain wave parameters can be measured, such as activity in the frontal, occipital, midline, and sensor-motor regions. Brain wave frequency ranges that can be measured include the following: alpha (8-12 Hz); beta (13-20 Hz); beta high (17-20 Hz); beta low (13-16 Hz); theta 3.5-7.5; delta (0.5-3 Hz); and Gamma (21-50 Hz). Driving performance can also be measured, such as speed reduction during performance of a task and ability to stay in a designated lane.

The measuring equipment can be included with the HMI evaluator device 30 (FIG. 2), which can be portable and include all of the equipment necessary to measure the performance parameters. The kit can be provided to manufacturers and/or to dealers to measure a driver's workload and ability to perform each task. The results can then be used by the manufacturer or dealer to customize the user interface to suit the driver's abilities.

Figure 2:
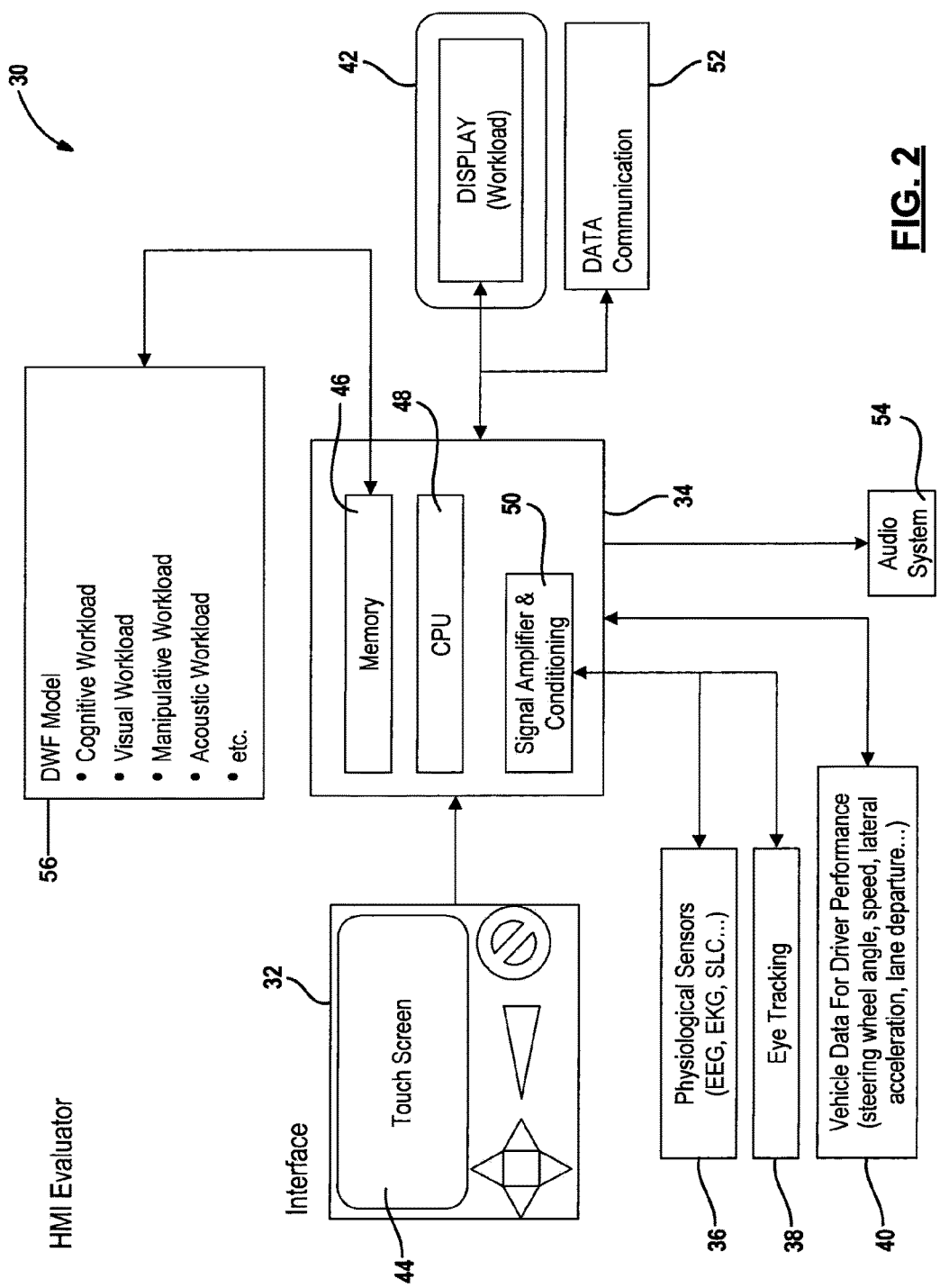
FIG. 2 illustrates a device for objectively measuring the driver's ability to operate the user interface.

With additional reference to FIG. 2, the HMI evaluator device 30 generally includes an interface 32 with a plurality of input devices (such as, for example, a touch screen, real and virtual switches, sliders, and/or knobs), a controller 34, a plurality of physiological sensors 36 (including EEG, EKG, and SLC sensors, for example), eye tracking sensors 38, vehicle data inputs 40 (including steering wheel angle, speed, lateral acceleration, and lane departure, for example), a display 42, and an audio system 54. The device 30 can be packaged into a compact assembly or kit that can be easily transported from vehicle to vehicle, for example.

The interface 32 can accept driver or user inputs in a variety of ways, such as through a touch screen 44, keypad, joystick, or any one of a number of other buttons or inputs. If, for example, the surrogate task includes selection of a vertical arrow from a plurality of horizontal arrows, the arrows can be displayed on the touch screen 44 and the vertical arrow can be selected using the touch screen 44. The interface 32 communicates with the controller 34 and transfers the inputs of the interface 32 to the controller 34.

The controller 34 includes a memory 46, a processor or computer 48, and a signal amplifier and conditioner 50. The controller 34 receives inputs from the physiological sensors 36 and the eye tracking sensors 38, and receives the vehicle data regarding driver performance 40 in order to objectively measure the driver's ability to perform each calibration task in terms of a driver workload function (DWF). The DWF is based on, for example, one or more of cognitive workload, visual workload, manipulative workload, acoustic workload, etc. (FIG. 2 at 56), as further described below. The performance parameter measurements and results of the calibration tasks can be displayed on the display 42 and transmitted to the display 42 through data communication 52. With reference to block 14 of FIG. 1, the driver's ability to perform each calibration task is used to generate a workload scale or meter that is customized to the driver. The scale can ultimately be used to gauge the driver's ability to operate a user interface. A DWF weighted value or weighted parameter value for each measured performance parameter is arrived at by multiplying the raw parameter score by a DWF factor, or weight, based on the relevance or importance of the performance parameter to the driver's ability to perform the calibration task. For example, because visual parameters or factors are typically more important than others, the visual performance parameters are given the most weight. Thus, percentage of visual glance time off the road can be assigned a DWF factor of 0.6, which is greater than a DWF factor of 0.15 assigned to the SRL parameter, for example.

To avoid one or more performance parameters from being given too much or little weight due to the absolute numeric value of the raw score, each performance parameter is scaled. For example, if the skin resistance level (SRL) is measured at about 25 mohm (0.025 ohm=2.5E-2) and the EEG level measured is 4E-6 J., the SRL measured value is about four order of magnitudes higher than the EEG value. If the EEG and SRL values are to be accorded the same importance or weight in the driver workload function, the SRL value will be over weighted simply due to the greater size of its absolute numeric value. The raw score of each performance parameter is thus multiplied by a scale factor to reduce or eliminate any absolute numerical differences between the measured values.

The DWF weighted values of each performance parameter for each of the calibration tasks, after being multiplied by the DWF factor and scale factor assigned to each parameter, are summed to arrive at a total DWF weighted value for each calibration task. The total DWF weighted value for each calibration task is then stretched to the driver workload scale of one to ten in any suitable manner, such as with a linear or non-linear stretch coefficient. The result is a final stretched DWF value for each calibration task, each of which are then plotted a the driver workload scale of one to ten to generate a scale on which to measure the driver's ability to operate a user interface, which is customized to the driver based on the objective measurements of the driver's ability to perform each calibration task. These calculations can be carried out by the CPU 48 of the controller 34.

Generation of the workload scale customized to the driver, which can be performed using the CPU 48 of the controller 34, will now be further explained in conjunction with the Example at FIG. 3. In the Example of FIG. 3, four different calibration tasks were performed: a drive only task; driving while selecting a vertical arrow from an arrangement of three horizontal arrows, which is a task of low difficulty; driving while selecting a vertical arrow from nine horizontal arrows, which is a task of medium difficulty; and driving while selecting the two largest circles from a plurality of twenty or more smaller circles, which is a task of high difficulty. The drive only task was assigned a predetermined workload value of 1, the low difficulty task was assigned a workload value of 3, the task of medium difficulty was assigned a workload value of 5, and the high difficulty task was assigned a workload value of 8. While all three calibration tasks have been described as being surrogate tasks, the calibration tasks may include one or more face valid tasks. For example, the low difficulty task could include changing the HVAC speed, the medium difficulty task could include setting a radio preset, and the high difficulty task could include setting a navigation route. Thus, the workload scale can be generated based on all surrogate tasks, all face valid tasks, or a combination of surrogate and face valid tasks. When a combination of surrogate and face valid tasks is used, the number of surrogate tasks used can be greater than the number of face valid tasks used.

In the Example of FIG. 3, the following performance parameters were measured: total task time in seconds; visual % glance time off the road; number of critical glances to the motor vehicle user interface or HMI; heart rate value in beats per minute (HRV); skin resistance level in ohms (SRL); brain wave EEG beta 1; and brain wave EEG beta 2. Each performance parameter was assigned a DWF factor weight based on the importance of each parameter. For example, the visual % glance time off road and the number of critical glances to the user interface were predetermined to be the most important, and were thus both given the highest DWF factor of 0.6. Total task time was determined as being the second most important factor and assigned a DWF value of 0.25. HRV was ranked third with a DWF factor of 0.22. SRL and EEG beta 1 were equally weighted with a DWF factor of 0.15 each. EEG Beta 2 was determined to be the least important parameter and thus assigned the smallest DWF factor of 0.1.

The value of each raw parameter score is first compared to a baseline value. For example and with respect to the measured 90 beats per minute (bpm) for the medium difficulty task performed while driving, because the 90 bpm is 9 bpm greater than the 81 bpm baseline measured while driving only, the 9 bpm difference is multiplied by the DWF factor of 0.22 and the scale factor of 10 to arrive at the DWF weighted value of 0.198. After each raw score is multiplied by the DWF factors and scale factors of each parameter, the resulting DWF weighted values for each measured parameter are summed to arrive at a total DWF weighted value. Thus, in the Example, for each calibration task the total DWF weighted value was 1.25 for the drive only task; 2.96 for the low difficulty task performed while driving; 4.33 for the medium difficulty task performed while driving; and 6.82 for the high difficulty task performed while driving.

The total DWF weighted values for each task are then "stretched" using the stretch function coefficient, such as a simple linear or nonlinear stretch coefficient. In this example, the stretch function coefficient used was 1.0965. Thus, each of the total DWF weighted values were multiplied by this coefficient. The result was a final stretched DWF value of 1.37 for the drive only task; 3.24 for the low difficulty task; 4.75 for the medium difficulty task; and 7.48 for the high difficulty task. Thus, for the specific driver tested, his/her workload for performing the drive only and low difficulty tasks was greater than expected, while his/her workload experienced for performing the medium and high difficulty tasks was less than expected.

With reference to block 16 of FIG. 1, the driver's personalized final stretched DWF scale can be used to objectively assess his/her ability and workload for performing an actual task of operating the user interface. For example and with reference to the Example at FIG. 3, the DWF weighted values of the performance parameters for performing the actual HMI task of changing a radio station while driving were summed to arrive at a total DWF weighted value of 3.80, which was multiplied by the stretch function coefficient of 1.0965 to arrive at a final stretched DWF value of 4.17. Thus, for this specific driver, the task of changing a radio station while driving ranked about halfway between a task of easy and medium difficulty for the driver.

The same method and calculations can be repeated for a variety of different tasks performed by the driver using the driver interface to arrive at a final stretched DWF value for each task. The sum of all of the final stretched DWF values is divided by the number of tasks to arrive at a graphical user interface/multi-modal interface value (GUI/MMI value) for the driver. Thus, if after performing a series of different tasks the driver's overall GUI/MMI value is, for example, greater then 7, then the user interface should be simplified for the driver. Conversely, if the driver's overall GUI/MMI value is less than 2 for example, then the driver may be provided with a more complex user interface including more features. In this way, the driver's ability to operate a motor vehicle user interface can be objectively determined to assess whether a particular user interface is appropriate for the driver's skills, as set forth at block 18 of FIG. 1. With reference to block 20 of FIG. 1, the user interface can then be modified to suit the driver as appropriate.

The ability to objectively evaluate a driver's ability or workload to operate a user interface and/or various functions thereof, provides the manufacturer and/or dealer with the ability to more precisely customize a user interface to a particular driver or user. For example, an elderly person who scores a high GUI/MMI value can be provided with a simplified database, and a young computer savvy customer who scores a low GUI/MMI value can be provided with a more advanced user interface with a greater number of features.

In addition to generating the workload scale based on the final stretched DWF for each calibration task as described above, the raw parameter score for each parameter can be plotted on the workload scale. For example and with respect to the HRV parameter of the Example of FIG. 3, the drive only heart rate of 81 bpm is plotted at a workload value of 1 because the drive only task was assigned a workload value of 1. Similarly, the low difficulty task heart rate of 85 bpm is assigned a workload value of 3; the medium difficulty task heart rate of 90 bpm is assigned a workload value of 5; and the high difficulty task heart rate of 100 is assigned a workload value of 8. The raw parameter score for the HMI task of changing the radio was 87 bpm, and thus with respect to HRV, changing the radio has a workload difficulty of about 4 on the driver's customized workload scale because 87 bpm is about halfway between 85 bmp and 90 bpm observed during performance of the surrogate tasks.

Any number of the other performance parameters may be added to the driver's workload scale in the same manner described in the preceding paragraph to provide for objective evaluation of the driver's ability to operate a user interface in terms of specific performance parameters. In this manner the effects of different performance parameters on the driver's ability can be isolated. For example, if for the HMI task of chancing the radio the driver scores a four for most of the performance parameters, indicating that the task is of medium difficulty, but scores a seven for % of glance time off the road, which is one of the most important parameters, the task may be determined to be too difficult for the driver. The user interface could be modified in a specific manner to reduce the % glance time off the road for the driver, and thus be customized to address the driver's shortcoming. To provide an overall GUI/MMI value for the driver, the workload difficulty for each performance parameter can be averaged.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of objectively measuring a driver's ability to operate a motor vehicle user interface comprising:

objectively measuring the driver's ability to perform each one of a plurality of calibration tasks of various degrees of difficulty, the measurements performed using at least one of EEG, EKG, SLC, and eye tracking sensors, wherein the driver's ability to perform the calibration tasks is objectively measured by measuring at least one of the following for each calibration task: total amount of time required to perform the calibration task, amount of time that the driver's eyes were off the road, heart rate, skin moisture level, body temperature, brain wave activity, or eye movement;

generating a scale with which to evaluate the driver's ability to operate the user interface, the scale customized for the driver based on the objective measurements of the driver's ability to perform each calibration task;

generating a plurality of driver work functions corresponding to the driver's ability to perform each one of the calibration tasks;

scaling each of the driver work functions to at least reduce absolute numerical differences between the driver work functions;

objectively measuring the driver's ability to operate a function of the motor vehicle user interface using at least one of EEG, EKG, SLC, and eye tracking sensors;

objectively evaluating the driver's ability to operate the function of the motor vehicle user interface using the scale to determine if the user interface is appropriate for the driver; and customizing the user interface for the user based on the user's objectively evaluated ability to operate the function of the motor vehicle user interface, wherein customizing the user interface for the user is based on the user's objectively evaluated cognitive ability to operate the function of the motor vehicle user interface.

2. The method of claim 1, wherein the calibration tasks include at least one of the following: identifying a pattern in a series of numbers presented to the driver; identifying differences in circle size among a plurality of circles displayed to the driver; and identifying arrows of different directions among a plurality of arrows displayed to the driver.

3. The method of claim 1, wherein at least one of the calibration tasks includes driving the vehicle.

4. The method of claim 1, wherein the driver's ability to perform the calibration tasks is objectively measured with a portable evaluator device including an interface, a controller, at least one physiological sensor, an eye tracking sensor, inputs for vehicle data, a display, and an audio system.

5. The method of claim 1, wherein the scale consists of a range of 1-10.

6. The method of claim 1, wherein the function of the motor vehicle user interface includes at least one of the following face valid tasks: operating a radio; operating climate control; operating a cell phone; or operating cruise control.

7. The method of claim 1, further comprising a motor vehicle including the user interface.

8. The method of claim 1, wherein the driver's ability to operate the function of the motor vehicle user interface is objectively measured by measuring at least one of the following during operation of the function: total amount of time required; amount of time driver's eyes were off the road; heart rate; skin moisture level; body temperature; brain wave activity; or eye movement.

9. The method of claim 8, wherein the driver's ability to operate the function of the motor vehicle user interface is objectively measured with a portable evaluator device.

10. A method of objectively measuring a driver's ability to operate a motor vehicle user interface comprising:
 objectively measuring the driver's ability to perform each one of a plurality of calibration tasks of various degrees of difficulty, the measurements performed using at least one of EEG, EKG, SLC, and eye tracking sensors, wherein the driver's ability to perform the calibration tasks is objectively measured by measuring at least one of the following for each calibration task: total amount of time required to perform the calibration task, amount of time that the driver's eyes were off the road, heart rate, skin moisture level, body temperature, brain wave activity, or eye movement;
 generating a scale with which to measure the driver's ability to operate the user interface, the scale customized for the driver based on the objective measurements of the driver's ability to perform each calibration task;
 generating a plurality of driver work functions corresponding to the driver's ability to perform each one of the calibration tasks;
 scaling each of the driver work functions to at least reduce absolute numerical differences between the driver work functions;
 objectively measuring and evaluating the driver's ability to operate a function of the motor vehicle user interface using the scale, the measurements performed using at least one of EEG, EKG, SLC, and eye tracking sensors; and
 customizing the user interface for the user based on the user's objectively evaluated ability to operate the function of the motor vehicle user interface,
 wherein customizing the user interface for the user is based on the user's objectively evaluated cognitive ability to operate the function of the motor vehicle user interface.

11. The method of claim 10, wherein the driver's ability to operate the function of the motor vehicle user interface is objectively measured by measuring at least one of the following during operation of the function: total amount of time required; amount of time driver's eyes were off the road; heart rate; skin moisture level; body temperature; brain wave activity; or eye movement.

12. The method of claim 10, wherein objectively measuring the driver's ability to perform each one of the plurality of calibration tasks includes measuring a workload required of the driver to perform the calibration tasks.

13. A method of objectively measuring a driver's ability to operate a motor vehicle user interface comprising:
 objectively measuring driver workload required to perform each one of a plurality of calibration tasks of various degrees of difficulty using at least one of EEG, EKG, SLC, and eye tracking sensors, wherein the driver workload required to perform each one of the calibration tasks is objectively measured by measuring at least one of the following for each calibration task: total amount of time required to perform the calibration task, amount of time that the driver's eyes were off the road, heart rate, skin moisture level, body temperature, brain wave activity, or eye movement;
 generating a scale with which to measure workload incurred by the driver during operation of the user interface, the scale personalized for the driver based on the objective measurements of the workload used by the driver during performance of the calibration tasks;
 generating a plurality of driver work functions corresponding to the driver workload required to perform each one of the calibration tasks;
 scaling each of the driver work functions to at least reduce absolute numerical differences between the driver work functions;
 objectively measuring driver workload used by the driver to operate a function of the motor vehicle user interface;
 objectively evaluating workload used by the driver to operate the function of the motor vehicle user interface using at least one of EEG, EKG, SLC, and eye tracking sensors; and
 customizing the user interface for the driver to optimize workload used by the driver to operate the user interface based on the driver's objectively evaluated ability to operate the function of the motor vehicle user interface,
 wherein customizing the user interface for the driver to optimize workload used by the driver to operate the user interface is based on the driver's objectively evaluated cognitive ability to operate the function of the motor vehicle user interface.

14. The method of claim 13, further comprising objectively evaluating workload used by the driver to operate a plurality of functions of the motor vehicle user interface; and
 averaging the workload used to operate each one of the plurality of functions to identify workload used by the driver to operate the motor vehicle user interface generally.

* * * * *